Jan. 1, 1929.

W. A. PUNGS 1,696,973

HOLDING DEVICE

Filed Dec. 12, 1924

Inventor:
William A. Pungs

By

Attorneys

Patented Jan. 1, 1929.

1,696,973

UNITED STATES PATENT OFFICE.

WILLIAM A. PUNGS, OF DETROIT, MICHIGAN.

HOLDING DEVICE.

Application filed December 12, 1924. Serial No. 755,467.

This invention relates to a holding device and my invention aims to provide a portable apparatus that may be advantageously used as a dolly during the lifting operation or may be employed for backing up, bracing or holding any device which is adapted to be operated upon and which cannot be conveniently braced by manually held means.

My invention further aims to provide a magnetic holding device or anvil that may be easily and quickly attached to a support for retaining a rivet or other connecting member in place until such rivet or member is made fast. The magnetic holding device is primarily designed for engagement with a rivet head, and since some rivet heads are embossed or otherwise marked with trademarks, provision is made for engaging such a rivet head or any irregular end of a rivet or the like member so that the rivet or member will be firmly held while being made fast. The means which I employ for compensating such irregularities also permits of the magnetic holding device obtaining a firm purchase upon a support, there being no gap that would decrease the magnetic holding power of the device.

My invention further aims to provide a simple, durable and inexpensive rivet holding device wherein a rivet engaging abutment is yieldably supported, in one instance by the expansive force of the spring and in another instance by a handle member articulated with the device, so that any blow on the abutment is received by the handle member and not delivered against the manipulator of the holding device.

My invention will be hereinafter specifically described and then claimed, and reference will now be had to the drawings wherein Figure 1 is a side elevation of one form of holding device, partly broken away, and partly in longitudinal section;

Figure 1:
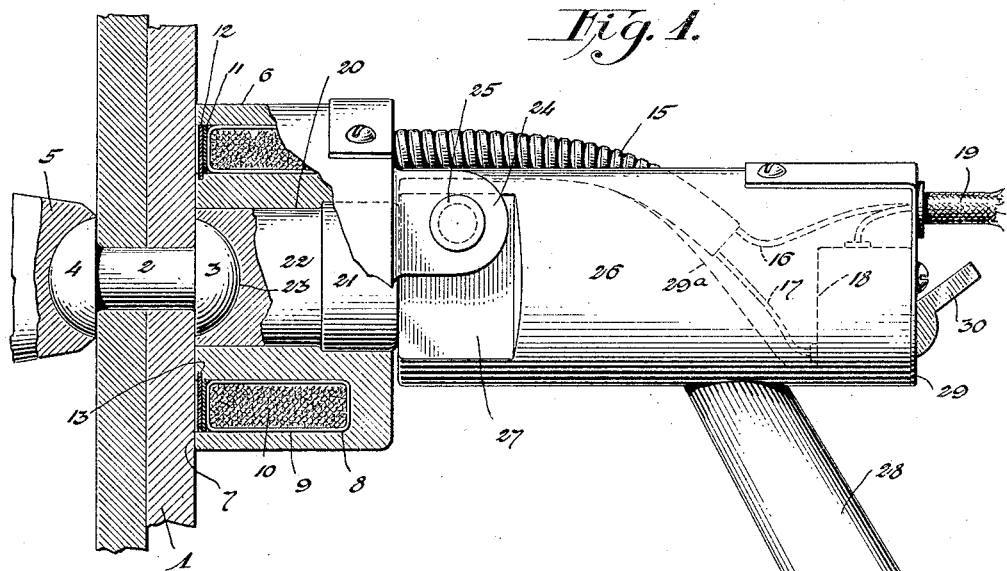
Figure 2:
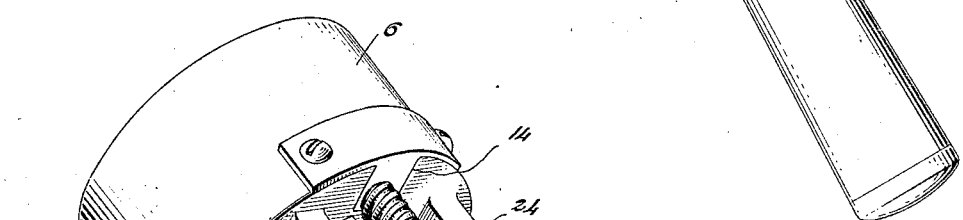
Fig. 2 is a perspective view of the device.

In the drawings, the reference numeral 1 denotes by way of an example supports or pieces of material adapted to be connected together by a rivet 2 having an initially formed head 3 and a securing head 4 which is formed by upsetting the end of the rivet 2 by using a riveting device 5 or other tool. During this operation it is necessary that the head 3 be held against the support 1 and a dolly is ordinarily employed for this purpose, the same being manually held with the result that the user of the dolly resists the blows delivered by the riveting device and this is laborious and injurious to the dolly user. Instead of depending on manual power to hold and brace the rivet 2, during the riveting operation, I have devised a holding device that is attached to the support 1 to hold and brace the rivet head 3, the device being of one or more forms that are portable and easy to install.

Considering the device shown in Fig. 1, there is a tubular magnetic body 6 having a flat outer face 7 adapted to be held against the face of the support 1 by magnetism. In the outer face 7 of the magnetic body 6 is a deep annular groove or chamber 8 in which is placed a magnetic coil 9 mounted on a core 10, the magnetic coil 9 being directed in any well known manner to render the same water proof. The magnetic coil 9 is retained within the body 6 by a heat resisting gasket 11 and a metallic closure member 12, said gasket being preferably of asbestos and said closure member split and resilient so that it could be fitted in an annular seat or groove 13 provided therefor in the magnetic body 6.

A side wall of the magnetic body 6 has an inset connecting member 14 by which a flexible casing 15 and electrical conductors 16 and 17 may be held in operative relation relative to the magnetic coil 9. The leading in conductors 16 and 17 are associated with a conventional form of switch 18 and a main conductor 19 with the switch disposed for easy operation by the manipulator of the holding device.

The bore or axial opening 20 of the magnetic body 6 has its inner end enlarged to afford clearance and a stop shoulder for the head 21 of a slittable abutment 22 which has its outer end provided with a recess 23 to receive the head 3 of the rivet 2.

The outer face of the magnetic body 6 has a pair of offset apertured ears 24 and pivotally mounted between said ears by a pivot pin or member 25 is the end of a handle member 26, said member having facets 27 reducing the end of the handle member whereby it may be pivotally mounted between the offset ears 24.

The handle member 26 is preferably cylindrical and its outer end is in proximity to the inner face of the magnetic body 6 so that it may engage the abutment 22 and be held against said abutment by the manipulator of the holding device holding a handle 28 of the handle member 26. The handle 28 is at an obtuse angle to the greater part of the handle member 26 and the inner end of said handle member has a longitudinal kerf or groove 29ª into which extends the flexible casing 15 and the leading in conductors 16 and 17. The switch 18 is placed in the kerf and retained therein by an end plate 29 attached to the handle member 26 with the switch operating lever or member 30 protruding from the end plate 29 to be operated by a thumb or finger of the hand gripping the handle 28. It will therefore be possible for the manipulator of the holding device to control the electrical energy of the magnetic body; cutting in the current when the magnetic body is to be attached to the support 1 and cutting out the current when the holding device is to be removed.

With the handle member 26 pivotally offset relative to the axis of the magnetic body 6, any blows delivered by the abutment 22 against the handle member 26 will be transferred to the offset pivot, thus relieving the manipulator of the holding device of stresses and strains incident to a riveting operation. It is obvious that the magnetic force produced in the magnetic body must be greater than any blow delivered against the rivet 2, and with the handle member 26 pivotally attached to the magnetic body the abutment 22 may adjust itself within the magnetic body when any irregulatities are encountered in the size of the rivet heads or protuberances on said heads.

Figure 3:
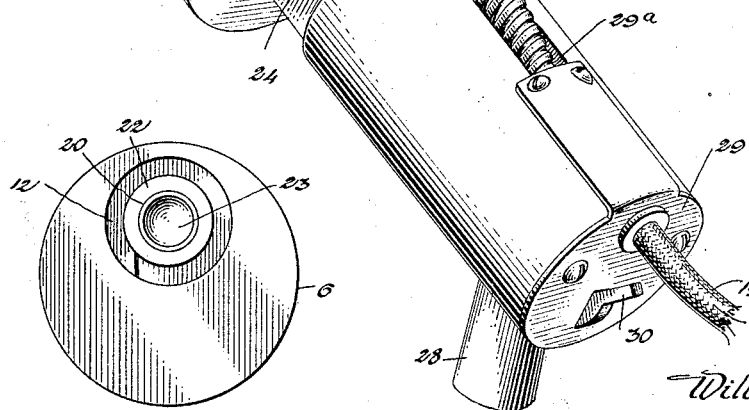
Fig. 3 is an end view of the device showing a slight modification.

As shown in Fig. 1, the abutment 22 is axially of the magnetic body, but in some instances the magnet and abutment may be offset relative to the body axis, as shown in Fig. 3. This may be necessary when adjacent rivets or structures do not provide sufficient clearance for a body having an axial rivet engaging abutment.

I attach considerable importance to the compact construction of the device, to the fact that the magnetic coil is fully enclosed and made as water proof as possible, and sufficient material included in the device to withstand the rough usage to which tools of this nature are ordinarily subjected.

While in the drawings there is illustrated a preferred embodiment of my invention, it is to be understood that the structural elements are susceptible to such variations and modifications as fall within the scope of the appended claim.

What I claim is:—

A holding device comprising a magnetic body by which said device may be attached to a support, a shiftable abutment slidable through said body, and a handle member adapted to engage and shift said abutment, said member being pivoted to the body on an axis offset from the longitudinal axis of said abutment.

In testimony whereof I affix my signature.

WILLIAM A. PUNGS.